Nov. 9, 1926.
J. TANCIN
SUSPENSION HOOK
Filed Feb. 4, 1926
1,606,273
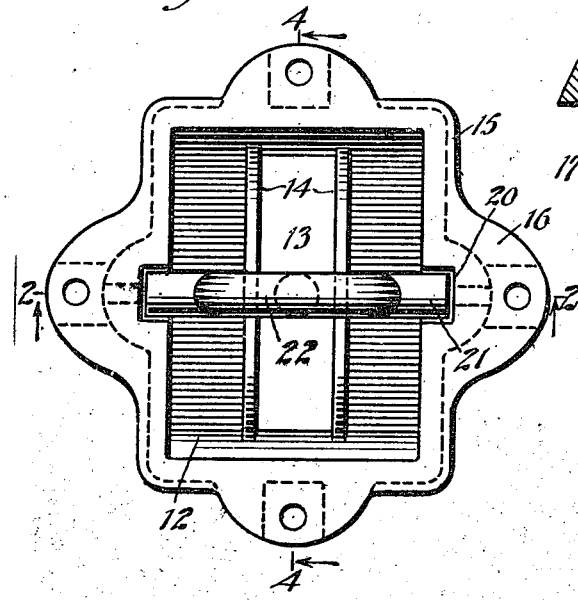
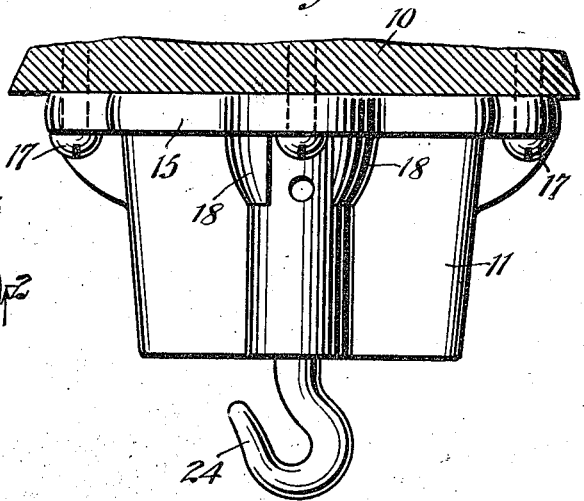
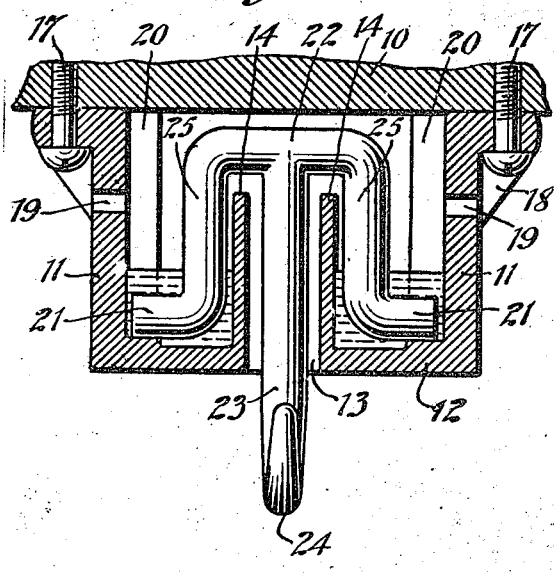
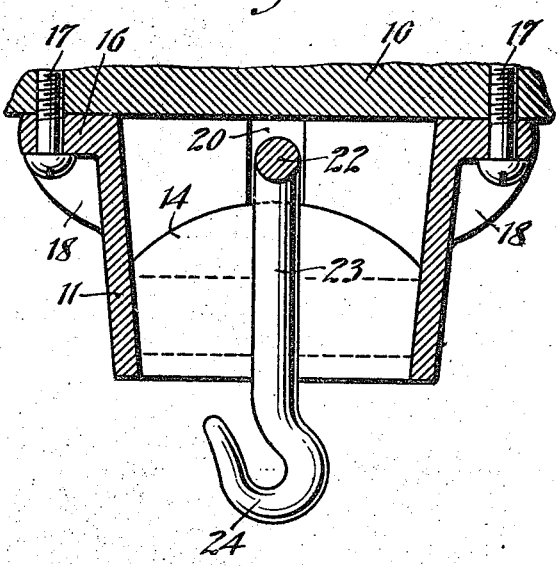
WITNESSES
INVENTOR
John Tancin
BY
ATTORNEYS Patented Nov. 9, 1926.

1,606,273

UNITED STATES PATENT OFFICE.

JOHN TANCIN, OF UPPER LEHIGH, PENNSYLVANIA.

SUSPENSION HOOK.

Application filed February 4, 1926. Serial No. 86,036.

The suspension hook of the present invention is in the nature of a self-lubricating device adapted for a wide range of utility in supporting various types of freely swinging elements, but finds its preferred embodiment in a noiseless hanger for porch swings and the like.

An object of the present invention is to provide a suspension hook so constructed that the pivot bearings for the hook are immersed in a bath of lubricating liquid.

A further object of the invention is to provide a two part device of this character which includes a combined oil reservoir and bearing box, and a hanger hook removably mounted in said box, both of the parts being of simple, practical construction and capable of ready attachment to any suitable supporting means.

Further objects of the invention are to provide a device of this character which will be rugged, durable and efficient in use, and which may be manufactured with comparative economy.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a top plan view of a suspension hook and its supporting bearing box.

Fig. 2 is a transverse section therethrough on the line 2—2 of Fig. 1, but showing the box attached to a suitable support.

Fig. 3 is a side elevational view of the device shown in Fig. 1.

Fig. 4 is a transverse sectional view on the line 4—4 of Fig. 1.

In the drawings I have used the reference character 10 to designate a ceiling, cross beam or other suitable support for the suspension hook. The device includes a combined oil reservoir and bearing box of open topped construction which comprises side walls 11 and a bottom wall 12. Communicating with an opening 13 in the bottom of the box, are a pair of transverse interior partition walls 14 which coact with the side walls of the box to define a pair of reservoir chambers, at the opposite sides of a central elongated opening.

The side walls 11 near their upper ends are outwardly flanged as at 15 and provide a series of laterally extending apertured ears 16 through which screws 17 or other appropriate securing devices are adapted to be passed for mounting the box on the under face of the support 10. Strengthening the flanged construction and protecting the screw heads, are a series of depending webs 18 preferably arranged closely adjacent the screw holes in the ears 16.

The reservoirs defined by the side walls 11, inner walls 14 and bottom wall 12 are adapted to receive lubricating oil, the oil line being below the inlet openings 19 in the side walls of the box. These inlet openings communicate with oppositely disposed vertical bearing grooves 20 in the interior of the box which receive horizontally disposed trunnion portions 21 at the extremities of the legs of an inverted U-shaped hanger 22, the intermediate portion of which is integral with the depending shank of a hook 24. The legs 25 of the inverted U-shaped element are of sufficient length so that the intermediate portion 22 thereof is disposed above the tops of the partitions 14. The shank 23 of the hook extends downwardly through the central opening 13 in the box and the trunnions 21 are confined in the bearing grooves 20 so that the suspension hook 24 rocks about the trunnions as bearings. The curved tops of the partitions 14 provide ample clearance for rocking movement of the U-shaped element on its trunnions.

Provision of the oil inlet opening 19 permits the reservoirs to be replenished at any time without removing the box from its support 10. The manner of use of the device will be obvious, as any suitable pending element may be hung upon the hook 24. The reservoirs may be filled with oil either before or after the application of the box to the support, and the assembly of the suspension hanger with the box simply consists in dropping the trunnions into their guide grooves.

Various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:—

1. A suspension device including an open topped box adapted to be secured to the under face of a horizontal support, said box including an opening in its bottom and internal vertical partitions cooperating with the side walls of the box to define oil reservoirs between the partitions and the walls on opposite sides of the central opening, a swing hook including bearing portions rockably mounted in the oil reservoirs, and a shank depending through the opening defined by the central partitions, the walls of the reservoirs being provided with pockets for the reception of the ends of the bearing members.

2. A suspension device including an open topped box adapted to be secured to the under face of a horizontal support, said box including an opening in its bottom and internal vertical partitions cooperating with the side walls of the box to define oil reservoirs between the partitions and the walls on opposite sides of the central opening, a swing hook including bearing portions rockably mounted in the oil reservoirs, and a shank depending through the opening defined by the central partitions, said hook including an inverted U-shaped element straddling the vertical partitions and terminating in laterally disposed trunnions having bearings in the oil reservoirs, the shank of the hook being rigid with the intermediate portion of said inverted U-shaped member.

3. A suspension device including an open topped box adapted to be secured to the under face of a horizontal support, said box including an opening in its bottom and internal vertical partitions cooperating with the side walls of the box to define oil reservoirs between the partitions and the walls on opposite sides of the central opening, a swing hook including bearing portions rockably mounted in the oil reservoirs, and a shank depending through the opening defined by the central partitions, said hook including an inverted U-shaped element straddling the vertical partitions and terminating in laterally disposed trunnions having bearings in the oil reservoirs, the shank of the hook being rigid with the intermediate portion of said inverted U-shaped member, said box having vertical bearing grooves in its interior for the reception of the trunnions.

JOHN TANCIN.